(12) United States Patent
Minter et al.

(10) Patent No.: US 10,810,290 B2
(45) Date of Patent: Oct. 20, 2020

(54) ROBUST METHOD AND AN APPARATUS FOR AUTHENTICATING A CLIENT IN NON-FACE-TO-FACE ONLINE INTERACTIONS BASED ON A COMBINATION OF LIVE BIOMETRICS, BIOGRAPHICAL DATA, BLOCKCHAIN TRANSACTIONS AND SIGNED DIGITAL CERTIFICATES

(71) Applicants: Ronald H Minter, Edgewater, FL (US); Pasteur Ntake, Bucerias (MX); Rama Mwikalo, Dar es Salaam (TZ)

(72) Inventors: Ronald H Minter, Edgewater, FL (US); Pasteur Ntake, Bucerias (MX); Rama Mwikalo, Dar es Salaam (TZ)

( * ) Notice: Subject to any disclaimer, the term of this patent is extended or adjusted under 35 U.S.C. 154(b) by 132 days.

(21) Appl. No.: 15/449,978

(22) Filed: Mar. 5, 2017

(65) Prior Publication Data
US 2018/0253539 A1   Sep. 6, 2018

(51) Int. Cl.
*G06F 21/32*      (2013.01)
*H04L 29/06*     (2006.01)
*G06K 9/00*      (2006.01)
*G06F 21/64*     (2013.01)
*H04W 12/06*    (2009.01)

(52) U.S. Cl.
CPC .............. *G06F 21/32* (2013.01); *G06F 21/64* (2013.01); *G06K 9/00892* (2013.01); *H04L 63/0823* (2013.01); *H04L 63/0861* (2013.01); *H04L 63/10* (2013.01); *H04W 12/0605* (2019.01); *H04W 12/0609* (2019.01)

(58) Field of Classification Search
None
See application file for complete search history.

(56) References Cited

U.S. PATENT DOCUMENTS

| | | | | |
|---|---|---|---|---|
| 9,990,418 | B1* | 6/2018 | Rogers | G06Q 20/145 |
| 10,142,333 | B1* | 11/2018 | Griffin | H04L 63/0861 |
| 2015/0128240 | A1* | 5/2015 | Richards | H04L 63/0861 726/7 |
| 2015/0379510 | A1* | 12/2015 | Smith | G06Q 20/3829 705/71 |
| 2017/0257358 | A1* | 9/2017 | Ebrahimi | H04L 9/3247 |

(Continued)

*Primary Examiner* — Kaveh Abrishamkar

(57) ABSTRACT

This invention describes a method, and an apparatus for identifying and authenticating an Individual Client (IC), or a Secure-Computing-Device online while ensuring the privacy of the IC's personal data, (IPD), and information against identity theft and fraud by using a combination of prior art Blockchain technology, public key cryptography, and a newly created Biometric Digital Certificate issued by an accredited Biometric Certification Authority. The IC's transactions data are dynamically updated, cryptographically signed for integrity and stored in an immutable blockchain each time the IC requests service from a Service Provider and provides an accurate and traceable audit trail. During online access, the IC transactions data stored in the Blockchain Databases are processed by a Data Analytics Authentication Processor to generate the Service-Access-Authentication-Tag, which is an algorithmic score that determines the IC's eligibility to access online services offered by a plurality of Services Providers.

18 Claims, 2 Drawing Sheets

Method and Apparatus for Enrolling and
Authenticating an Online Individual Client 100 (IC)

(56) References Cited

U.S. PATENT DOCUMENTS

2018/0048461 A1* 2/2018 Jutla ..................... G06F 21/33
2018/0374094 A1* 12/2018 Kohli .................. G06Q 20/401
2019/0013931 A1* 1/2019 Benini .................. H04L 9/006

* cited by examiner

Fig. 1: Method and Apparatus for Enrolling and
Authenticating an Online Individual Client 100 (IC)
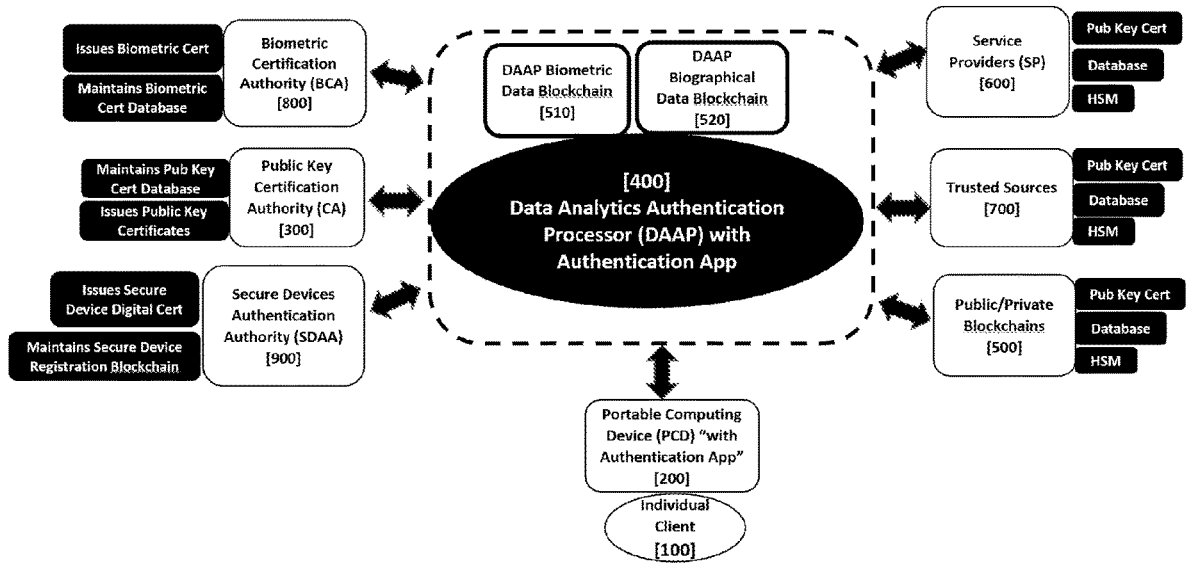

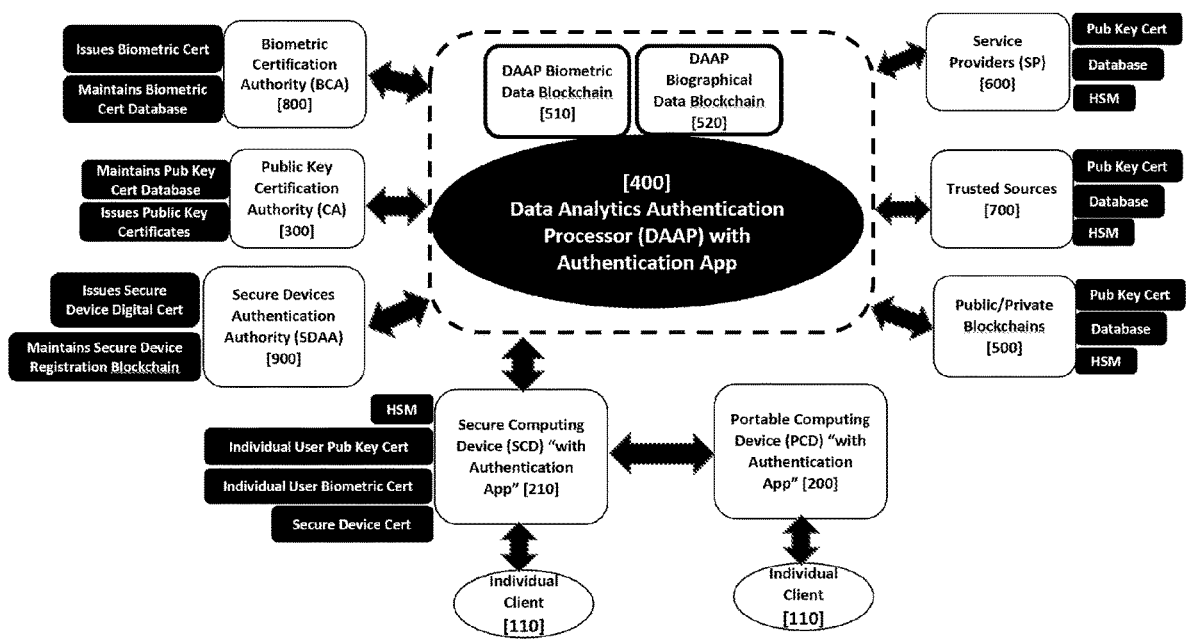
Fig. 2: Method and Apparatus for Enrolling and Authenticating an Online Secure Computing Device, (SCD, 210), with multiple ICs, 110.

ROBUST METHOD AND AN APPARATUS FOR AUTHENTICATING A CLIENT IN NON-FACE-TO-FACE ONLINE INTERACTIONS BASED ON A COMBINATION OF LIVE BIOMETRICS, BIOGRAPHICAL DATA, BLOCKCHAIN TRANSACTIONS AND SIGNED DIGITAL CERTIFICATES

GLOSSARY OF TERMS

The Individual Client (IC), 100 or Clients, (ICs), 110:

The Individual Client is defined as a user of a Portable-Computing-Device, (PCD), that may includes a smart phone or a similar device, or a Secure-Computing-Device, (SCD), such as a desktop computer or a server. The PCD or the SCD are trusted client devices because they are equipped with a dedicated prior art Hardware Security Module, (HSM), and/or a crypto processor that is specifically designed to protect the Individual Client's digital certificate, (also known as a Public Key certificate), and cryptographic keys that are required to perform non-face-to-face online transactions in a secure manner.

The Secure-Computing-Device, (SCD), 210:

The Secure-Computing-Device, (SCD), is a desktop computer or computer server comprising a dedicated prior art Hardware Security Module, (HSM), and/or a crypto processor that is specifically designed to protect it's digital certificate, (also known as a Public Key certificate), and the cryptographic keys that are required to perform non-face-to-face online transactions in a secure manner. A Secure Device Digital Certificate, (SDDC), issued by a Secure Computing Devices Certification Authority, (SCDCA), to the SCD is intended to uniquely identify the SCD and cryptographically confirm that it complies with national and/or international devices registration standards and therefore is a trusted device that can be relied upon to perform non face-to-face online transactions.

Secure Device Digital Certificate, (SDDC):

A Secure Device Digital Certificate, (SDDC), is a digitally signed electronic document issued by a certified private organization or government agency that contains the public key and digital signature of the person authorized to register the Secure-Computing-Device (e.g. desktop computer) as the owner. In the case of a Secure-Computing-Device (e.g. computer server) that is owned by an entity such as a company or organization and shared among several employees, the certificate contains the public key and digital signature of the contact person or employee that has been authorized to register the device at the Secure Computing Device Certification Authority as well as the public keys of the ICs associated with the company or organization (e.g. employees) who have been duly-authorized to use the Secure-Computing-Device to conduct online non-face-to-face transactions on behalf of the company or organization. Other information contained in the SCD Digital Certificate include the unique serial number assigned to the secure device by the manufacturer, the unique serial number assigned to the SCD Digital Certificate by the issuing authority, the public key of the private entity or government authority that issued the SDDC with the digital signature of the issuing Secure Device Certification Authority, the date of issue of the certificate and the expiration date of the certificate.

Portable-Computing-Device, (PCD), 200:

The Portable-Computing-Device, (PCD), is an intelligent, portable device such as a smartphone or laptop computer equipped with a dedicated prior art Hardware Security Module, (HSM), or a crypto processor that is specifically designed to protect the Individual Client's unique digital certificate, (also known as a Public Key certificate), and a cryptographic keys that are required to perform non-face-to-face transactions in a secure manner. The PCD is also issued a digital certificate by the Secure Devices Certification Authority, (SDCA), to confirm its unique online identity and provide assurance that the device is a trusted entity and can be used securely in a-non face-to-face online transactions. The Individual Client engaged in non face-to-face transactions is required to use the certified PCD for online authentication.

The Data Analytics Authentication Processor, (DAAP), 400:

The DAAP is as a smart computer processor-based data processing and analysis engine equipped with Application Program Interfaces (APIs) to facilitate communications with other devices and databases as depicted in Specification drawings FIG. 1 and FIG. 2. The DAAP receives as input the IC's biometric data, IC's biographical data and IC's live-video clips while performing actions as directed by the DAAP. These IC personal data along with the data from the Service Providers Databases, 600, the Trusted Sources Data-bases, 700, the public/private Blockchains Databases, 500, the Biometric Blockchain Databases, 510, the Biographical Blockchain Databases, 520, the Biometric Certification Authority, 800, the Secure Devices Certification Authority, 900, and the Public Key Certification Authority, 300, are processed by the DAAP using a range of proprietary and prior art data processing and matching algorithms to generate a Service-Access-Authentication-Tag, (SAAT), which is then submitted to the Blockchain Authentication Process.

The Biometric Digital Certificate, (BDC)

In this invention, the IC's Biometric Digital certificate, (BDC), is a digitally-signed electronic document comprising: an IC's Public Key the name of the IC unique serial number date of issue expiration date the name of the Biometric Certification Authority (BCA), that verified the IC's biometric data the digital certificate of the issuing BCA the algorithm used to sign the BDC the secure web address, (URL), of the public/private Blockchain database where the biometric images/data are stored in a standard-based interoperability format such as ISO 19794-2 or ANSI 378 with its associated biometric hashes that can be used for online biometric verification.

The Blockchain Authentication Process:

The use of Blockchains for immutable storage of data transactions ensures that the stored records will never change, and this use is well documented in the industry. This invention takes it one step further; it exploits the concept of data immutability and the cryptographic linkage between current transactions and past transactions to algorithmically correlate past and present records to create an authentication score for an Individual Client. The Blockchain Process as used in this invention refers to the specific processing that the Data Analytics Authentication Processor, (DAAP), must perform during an online enrollment-request-session or an online service-request-session for the purpose of authentication. To perform this functions, the DAAP requests and receives data directly from an IC, comprising, the IC's biographical data, the IC's Biometric data and the IC's live-video clips, and additionally, the DAAP requests and retrieves the IC's biometric data, IC's biographic data and any IC's live-video clips from all Blockchain Databases from various sources including the IC's data from the Service Providers Databases, the Trusted Sources Databases, other Public/Private Blockchain databases, the Biometric Certification Authority, and the Secure Devices Certification Authority. Since the DAAP is at the heart of the authentication process in the present invention, its operation is critically dependent on the integrity of data the DAAP receives from multiple sources. The DAAP places a high degree of confidence on data that is sourced from the public/private blockchains and the Trusted Sources databases. For example, if the information is stored in the Blockchain databases, the DAAP will request previous data blocks to determine if they are cryptographically hashed and linked to the latest data to establish the integrity of the data. In fact, the DAAP algorithm that generates the SAAT score assigns a higher weight to any data that is known to originate from the certified public or private distributed blockchain databases because each data block stored in a blockchain is cryptographically signed and linked to the last block making it an immutable record. Armed with such data, the DAAP proceeds to algorithmically calculate the Service-Access-Authentication-Tag, (SAAT), and creates an electronic file that is digitally signed by the DAAP attesting to authenticity and integrity of the data contained therein. The data in the file includes a weighted and normalized SAAT with the IC's data including the type of service requested. This file is sent to all the Blockchain Databases on the network as well as the certification authorities for safe keeping.

The Service-Access-Authentication-Tag, (SAAT), the Enrollment-Authentication-Tag, (EAT) and the Session-Authentication-Tag, (SAT):

The SAAT is a weighted and normalized data-matching score dynamically generated by the DAAP when the IC's personal data received during a service-request-session is compared to the IC's personal data captured earlier. The SAAT score is generated using various prior art matching algorithms, (such as face, fingerprint recognition algorithms, etc.), and is normalized to fall in the range of 0-100. The matching algorithm uses the IC's personal data such as IC's biometric data, IC's biographical data and IC's live-video clips which are then processed by proprietary algorithms to generate the SAAT score.

The two primary inputs to the SAAT algorithms executed by the DAAP are: the enrollment authentication data captured during an IC enrollment-request-session, and the service-request-session data captured during an IC service-request-session. The DAAP uses the enrollment authentication data to generate the Enrollment-Authentication-Tag (EAT), which is an authentication score derived algorithmically from the information provided by the IC. Additionally, the DAAP uses the service-request-session authentication data to generate the Session-Access-Tag, (SAT), which is an authentications score derived algorithmically from the information provided by the IC.

Next, the DAAP combines the EAT and the SAT scores algorithmically to generate the final weighted SAAT score that is submitted to the Service Providers as part of the IC service-request-session data that is used by the Service Providers for the final determination whether to grant or deny service access to the IC. Weighted in this case, means each of the IC's data used to calculate the SAAT is assigned a value that is based on its importance, some data are more important than others. For example, a bank wanting to lend money to an IC would give more importance, i.e. a higher weight, to the credit reference agency rating information than to other less important information such as the IC's gender or residential address.

The Biometric Blockchain Databases, (BGBD), (510):

The Biometric Blockchain Database as used in this invention can be described as a database-that contains the IC's biometric data such as fingerprint scans, facial images, retina scans, iris scans, voice print samples, palm images, etc. samples in raw or minutiae captured by the PCD or the SCD biometric capture devices during the live, online enrollment-request-session or online service-request-sessions. The Biometric data in the Biometric Blockchain Database are arranged as a growing list of chained blocks of write-only data records with each block linked to a previous record using cryptographic hashing algorithms such as prior art Secure Hash Algorithms (SHAs). Therefore, there are no Blockchain administrators with super-user permissions that would be allowed to edit or delete any of the records stored in the Blockchain database; a feature that makes a Biometric Blockchain database immutable and secure.

The Biographical Blockchain databases, (BBD) 520:

The Biographical Blockchain database can be described as a database that contains individuals' biographical data records such as name, date of birth, gender, current address, and employer, etc. captured by the PCD or the SCD during a live online biographical enrollment-request-session or a service-request-session. This biographical data is stored in the Blockchain database by the DAAP, 400, as a growing list of chained biographical data blocks of records that have been confirmed, encrypted and hashed.

The Biometric Certification Authority, (BCA),

The Biometric Certification Authority, (BCA), is a private or public entity is certified authorized to issue Biometric Digital Certificates, (BDC) to ICs. The BCA provides assurance that it has the certified IC's biometric data in its immutable Blockchain database or traditional relational database systems such as Oracle, Microsoft, SQL Server or MySQL. The Biometric Certification Author: third party trusted by the IC, the Data Analytics Authentication Processor, (DAAP), the Service Providers, the public/private Blockchain users, and the Trusted Sources who rely upon the Biometric Digital Certificate to authenticate the IC.

The Secure Device Certification Authority, (SDCA), 900:

The Secure Device Certification Authority, (SDCA) is an entity that is legally authorized to issue a Secure Devices Digital Certificate, (SDDC). The SDCA acts as a third party entity that is trusted by the IC, the Data Analytics Authentication Processor, (DAAP), the Service Providers, the Trusted Sources and other public and/private Blockchain parties relying upon the Secure Devices Digital Certificate, (SDDC) for device authentication. The Secure Device Certification Authority, (SDCA), confirms that the device identified is compliant with secure devices) standards developed by international and national standards setting bodies. The SDCA also provides assurance of the ownership of a public key to the Portable-Computing-Device, (PCD), or the Secure-Computing-Device, (SCD).

The Trusted Sources, 700:

A Trusted Source comprises: a certified private business or government agency that has the authority to receive, analyse and confirm the authenticity of various official electronic documents submitted online that include: the IC's SAAT score, generated by the DAAP, the Public Key Digital Certificate, the Biometric Certificates, and the Secure Device Certificate.

The Trusted Sources Databases, (TSD):

The Trusted Sources Databases as used in this invention can be described as databases residing on the Trusted Sources servers/computers containing the IC's personal data which comprises: the IC's Biometric data, Biographical data and the IC's live video clips stored on standard relational database systems such as Oracle, Microsoft, SQL Server or MySQL or on the Blockchain servers that the Trusted Source may have.

The Service Provider(s), (SP), 600:

The Service Provider(s) are business entities or government entities (such as banks, retail sales companies, etc.) that provide specific, services to ICs and have the same or similar authentication requirements. In this invention, the Biometric Certification Authority, the Public Key Certification Authority, and the Secure Devices Certification Authority are also considered to be Service Providers.

The Service Providers Databases, (SPD):

The Service Providers Databases as used in this invention can be described as the databases residing on the Service Providers servers/computers containing the IC's personal data which includes the IC's Biometric data, Biographical data and the IC's live video clips stored on standard relational database systems such as Oracle, Microsoft, SQL Server or MySQL or on the Blockchain server that the Service Provider may have.

Public Key Cryptography, Public Key and Private Key

Public key cryptography is a prior art encryption technique that uses a paired and linked public and private key mathematical algorithm to secure data communication between a sender and receiver. It is used in this invention to secure information exchange among various entities identified in FIGS. 1 and 2. A Public Key is a large randomly generated number that is used by the sender to encrypt the message while a private key is another large random number that is mathematically-linked to a public key and is used by the receiver to decrypt a message. The Public and Private key pair are unique, mathematically related, cryptographic keys that ensure that a message or document encrypted with the Public Key cannot be decrypted without using the corresponding Private Key. The Public Key is a public identifier, and, in this invention, a unique public key is assigned to the Individual Clients, the Portable-Computing-Devices, the Secure-Computing-Devices, the Data Authentication Analytics Processor, the Certification Authorities, the Service Providers, the Blockchain Databases and the Trusted Sources Databases. While the Public Key is widely distributed, the Private Key is kept secret which means only the owner of the Private Key can decrypt the message that was sent using the Public Key. That unique property existing between the Public Key and Private Key is used in cryptography to achieve information confidentiality.

Digital Signature:

In this invention, another important aspect of prior art Public Key Cryptography which is exploited is its ability to create a Digital Signature which is an additional technique based on complex mathematics that guarantees to the recipient of a message or document that its contents have not been tampered with during transit. All the electronic documents exchanged between various entities in this invention, such as the Public Key Certificates, the Biometric Digital Certificates, the SAAT matching-score, etc. are digitally signed so that the recipient is assured of the integrity of the contents and the authenticity of the source of the electronic document. The Digital Signature is also used to secure the records on the Blockchain databases.

Blockchain Technology:

Prior art Blockchain technology is a distributed database existing on multiple computers and servers at the same time. It is constantly growing as new records, or "blocks" are added to it. Each block of data is time stamped, linked to the previous data and encrypted in a way that allows all users on the network to access the data but only users with special cryptographic keys can add to the data records. This database is not managed by an individual, instead, everyone in the network gets a copy of the whole database. Old blocks are preserved for ever and new blocks are added making it impossible to manipulate the information in the database by using fake documents, transactions or other information. In this invention, this prior art Blockchain technology is used as an incorruptible database of the IC's time-stamped and immutable electronic data records such the IC's Biometric data, the IC's Biographical data, etc., that are stored as blocks of data and managed by a cluster of distributed servers that may be privately or publicly owned and prevents common threats associated with cybersecurity attacks such as phishing, spoofing or man-in-the-middle attacks, (MITM)

IC's Biometric Data, (ICBD):

The IC's Biometric Data as used in this invention is defined as the data that represents metrics related to human physiological or behavioral characteristics. An IC's physiological biometrics may include DNA data, iris scans, retina scan, ear prints, fingerprints, palm prints, facial geometry, odor, finger geometry, hand geometry, vein patterns, signature recognition, color of skin, etc. Behavioral biometrics may include voiceprints, signature dynamics, keystroke dynamics, gait or walking-style patterns, motion recognition (motion of hands while speaking), etc.

IC's Biographical Data, (ICBID):

The IC's Biographical Data as used in this invention comprises of an IC's personal information that includes: name, address, height, weight, date of birth, gender, marital status, education, name of employer, occupation, office address, residential address, email address, schools attended, mother's name, father's name, medical history, etc.

IC's Personal Data, (IPD):

The IC's personal data as used in this invention comprises the IC's Biometric data the IC's Biographical data and the IC's live-video clips captured during an enrollment-request-session or service-request-session IC's live-video clips, and IC digitized hand-written signature samples.

IC's Personal Data Security:

The IC's Personal Data security refers to technical measures implemented to ensure that an IC's personal data are protected from online breaches that could potentially lead to the accidental or unlawful destruction, loss, alteration, access or disclosure to unauthorized persons in compliance with legal requirements and regulations. IC personal data security as used in this invention is achieved by the use of Blockchain Databases to store IC's data, the use Biometric Digital Certificates to allow or deny access and by the use of Public Key cryptography to eliminate fraud by the man-in-the-middle.

Other Public/Private Blockchain Database, (PPBD):

Public Blockchain as used in this invention can be described as distributed ledger or database which can receive transactions from and send transactions to the general public and whose integrity can be audited by any member of the public. In Private Blockchain only pre-chosen entities such as certified Service Providers or Government Agencies are authorized to add new transactions on the Blockchain database. The Blockchain database structure comprises "data blocks" that are cryptographically linked to each other, which makes the data on the database perpetual and immutable. Before a transaction is considered valid so that it can be permanently added to the Blockchain database, it must be authorized by undergoing a consensus process supported by the Blockchain cryptographic protocols.

IC's Live-Video Clips, (ICLVC):

An IC's live-video clips as used in this invention refers to a short video clip of an IC performing physical actions, such as hand movement when asked to provide sample of a hand-written signature or lip movements when reading random phrases or words. Such video clips are captured live by a PCD or SCD in response to a request from the DAAP and submitted for liveness analysis.

BACKGROUND

Field of Invention

The present invention generally relates to an identification and authentication apparatus, and a method for identifying and authenticating a client seeking to complete an online non-face-to-face transaction. The client in this invention includes the Individual Client, (IC), 100, using a Portable-Computing-Device, 200, (PCD) or the IC, 110, using a Secure-Computing-Device, 210.

Description of Related Art

The Individual Client, (IC), 100, an identification and authentication patents has been recently issued to Paul T. Schultz et al as U.S. Pat. No. 9,323,912 describing a method using multi-factor biometric authentication. Recently, RONALD Henry Minter et al were issued U.S. Pat. No. 9,544,308 that describes authentication of the Individual Client using an individual's biometric data and biographical information and live-video clips. The authors of this invention are also aware of patents and publication whereby digital certificates have been used for signing online documents. These publications include U.S. Pat. No. 9,565,188, publication #20140040135 publication #20120284591, and U.S. Pat. No. 9,560,004. This is a follow on of the provisional application No. 62/458,877 filed Mar. 5, 2017. This invention addresses the following shortcomings in most known prior art multi-factor authentication (MFA) systems and methods for positively identifying and authenticating a client in an online non-face-to-face transaction.

In most MFAs, the client's data are generally stored in a conventional non-distributed system located at Service Providers premises. This can lead to possible data breaches due to hacking wherein the client's personal identities are stolen and used fraudulently.

The Service Providers cannot always identify/authenticate a client with full confidence that the client requesting online services is indeed the same person whose data is on file at the Service Providers databases.

The Individual Clients cannot be guaranteed that their personal data has not or will never be altered by hackers or by unscrupulous employees of the Service Providers.

Attacks by the man-in-the-middle (MITM) are common in most known authentication methods and systems. The attacker secretly relays and possibly alters the communication between two parties who believe they are directly communicating with each other. The attacker then collects any valuable client's data that can be used later to commit fraud.

Stolen client's computing devices or business computers often contain company data, and employee identity data. This data, once in the hands of professional hackers can be used to commit fraud.

Most businesses would like to carry out machine-to-machine transactions without human intervention. However, businesses are generally concerned by the man-in-the-middle or unscrupulous business employees who may alter the transactions to benefit themselves.

Often, clients are required to present themselves physically at the Service Providers' premises to either register for a service or to execute transactions. This creates an inconvenience to the client as it may involve traveling time and costs.

SUMMARY

This invention describes a method and an apparatus for authenticating the Individual Client, 100 or 110, equipped with the Portable-Computing-Device 200, (PCD), or the Secure-Computing-Device, 210, (SCD) using prior art Blockchain technology, prior art Digital Certificates technology, IC's personal data and live video clips of the IC performing actions as directed by the Data Analytics Authentication Processor, (DAAP), This invention not only overcomes most of the authentication shortcomings associated with prior art multi-factor-authentication (MFA) methods as described in BACKGROUND section, but also ensures enhanced IC's personal data security comprising:

a. employing a combination of the digitally signed Public Key Digital Certificates, the IC's Biometric Digital Certificates, the Secure Devices Digital Certificates, the IC's live video clips captured by the IC's PCD or the SCD biometric capture devices while performing certain actions as directed by the DAAP, 400, the most recent IC supplied Biometric data, the most recent IC supplied Biographical data and with the most up-to-date data from the Blockchain Biometric Database and data stored in other public/private distributed Blockchain transaction ledgers to authenticate the IC which makes hacking by man-in-the-middle, (MITM), to steal the IC's identities impossible since a hacker would be obligated to gain access to multiple data sources that are secured and encrypted.

b. This invention creates the Biographic Blockchain database, 520, and the Biometric Blockchain Database, 510, designed specifically for authenticating, the IC. The IC's personal data in the Blockchains are dynamically updated and digitally signed each time new live samples are captured. The Blockchain serve as a permanent unchangeable history of the IC's biometric data or IC's biographical data that can be used to create a completely traceable audit trail, including dynamically changing identity credentials of the IC. Thus, the distributed nature of the Blockchain databases also makes it virtually impossible for hackers to access all Blockchain Database servers at the same time.

c. This invention introduces the concept of the IC's Biometric Digital Certificate issued by the accredited Biometric Authentication Authority. The Biometric Digital Certificate (BDC) is an encrypted digital certificate that contains its owner's public key, and other identification information including and especially the name of the certification authority that issued the biometric digital certificate, and domain address of the biometric blockchain where the biometric samples are securely and permanently stored. Access to the Biometric Blockchain is granted through the digitally signed IC's Public Key Digital certificate as supported by the Blockchain Authentication Process policies.

d. The use of the Biometric Blockchain technology prevents the use of stolen identities to commit fraudulent acts such as requesting an unauthorized online transaction from a Service Provider. The Blockchain biometric identities including live-video clips of the IC are securely stored in several nodes in the Blockchain network and hence can not be modified or be altered without leaving obvious traces.

e. This invention introduces the use of the Secure-Computing-Device (SCD), 210, to automatically execute some online transactions, thus machine-to-machine transactions are supported and can be executed securely with the normal guarantees of data confidentiality, authenticity, integrity and non-repudiation using encryption and digital signatures, which translates into quick online transaction approvals obviating the need for human intervention. Additionally, all such online transactions are permanently recorded and stored in the distributed Blockchain Databases with completely traceable audit trails.

f. This invention guarantees that when the Secure Device Digital Certificate, (SDDC), is issued to the Secure-Computing-Device, 210, its identity is unique and cannot be spoofed since it is protected by a prior art Hardware Security Module, (HSM), whose authenticity is guaranteed by the Secure Device Digital Certificate issued by the accredited Secure-Computing-Device Certification Authority, 900. The Individual Clients', 110, identities are also confirmed through the IC's Public Key Digital Certificates and the IC's Biometric Digital Certificates. All these certificates are digitally signed and securely managed by the Hardware Security Devices associated with the Secure-Computing-Device. Thus, the SCD is a trusted machine that can carry out machine to machine transactions without the need for human intervention.

g. This invention creates the Service-Access-Authentication-Tag, (SAAT), and a tailored, detailed IC specific list of scores to the Service Provider, 600, dependent on the previously agreed to requirements between the Service Provider and the DAAP. The SAAT can be used to determine precisely and securely the IC's eligibility and entitlement to access services offered by a plurality of the online Services Providers without compromising the confidentiality and privacy of IC's personal data.

h. This invention eliminates the need for the IC to physically visit the Service Provider's, 600, premises in order to sign or witness the signing of important documents including legally binding contracts, since such transactions can be executed online by the IC using the Personal Computing Device or executed automatically by the Secure-Computing-Device, 210, equipped with the appropriate Secure Device Digital Certificate and a hardware security module. For example, this invention makes possible the secure wire-transfer of money without visiting the financial institution or signing of important contracts while away from business location at home or when travelling.

i. The addition of IC's live-video clips of the IC while performing certain actions as directed by the DAAP, 400, to the Biometric Blockchain database, 510, ensures that the online IC is a live person and not a set of still pictures or videos created by an online fraudster. Thus, the online video clips in combination with the IC's biometric data and the IC's biographical data provide further proof to the Service Provider that the Individual Client is a live human being and is indeed the same person he/she claims to be.

BRIEF DESCRIPTION OF THE DRAWINGS

FIG. 1 The Method and Apparatus for Enrolling and Authenticating the Online Individual Client, 100, (IC), with the PCD, 200.

FIG. 2 The Method and Apparatus for Enrolling and Authenticating the Online Secure-Computing-Device, (SCD), with multiple ICs, 110.

DETAILED DESCRIPTION OF THE INVENTION

The identification and authentication of the online Individual Client(s), 100, or 110, using the Portable-Computing-Device or using the Secure-Computing-Device (SCD), 210, is a seven-step process, comprising:

a. A process for a mandatory self enrollment of the IC, 100, or 110;

b. A process of gathering the IC's personal data from other public/private Blockchain databases, 500; Service Providers databases, 600; the Trusted Sources databases, 700; Biometric Blockchain Databases, 510; and Biographical Blockchain databases, 520;

c. A process for gathering the IC's personal data directly from the IC;

d. A process of analyzing and correlating the IC's biometric data, the IC's biographical data, and the IC's live-video clips using the Data Analytics Authentication Processor (DAAP), 400, to create the Service-Access-Authentication-Tag, (SAAT) and the IC's service-specific profile score consistent with the Service Providers, 600, requirements;

e. A process that allows the IC to request services from the Service Providers, 600;

f. A process for creating and updating the Biometric Blockchain databases, 510, and the Biographical Blockchain databases, 520, based on the latest information collected during the service-request-session; and g. A process for granting or denying access to requested services based on the SAAT score.

FIG. 1 is a block diagram of the method and apparatus that allows the online Individual Client, 100, using the PCD to enroll and subsequently to request services a from the Service Provider, (SP), 600. In a preferred embodiment of this invention, the IC is assumed to have been issued the IC's Public Key Digital Certificate by the Public Key Certification Authority, 300. The IC is also assumed to have been issued the IC's Biometric Digital Certificate by the Biometric Certification Authority (BCA), 800. It is further assumed that the various distributed Blockchain databases, 500, both private and public Blockchains, have been created to support access to various service sectors that the IC may need to access today and, in the future, (eg Banking, Real Estate, Company Registration, Driver License, Birth Registration, Death Registration, etc.). In a preferred embodiment of this invention, the DAAP continuously updates the information stored in the Biometric Blockchain Databases, 510, and the Biographical Blockchain Databases, 520, based on the latest data captured when the user requests access to a service. Also, in yet another preferred embodiment of this invention the Biometric Certification Authority uses the information securely stored in in the Biometric Blockchain Databases, 510, and the Biographical Blockchain Databases, 520, to issue the IC's Biometric Digital Certificates. Also, in accordance with a preferred aspect of this invention, the Service Providers are expected to create sector-specific Blockchain databases to suit their business model. The Data Analytics Authentication Processor (DAAP), 400, is central to the identification and authentication of an IC and therefore it is primarily responsible for data collection, data analysis, data correlation, updating the Biometric Blockchain Database,

510, used by the BCA, updating the Biographical Blockchain Database, 520, and calculating a SAAT score which is used as the basis for denying or granting access to the service.

FIG. 2 is a block diagram of the method and apparatus that allows the Secure-Computing-Device, (SCD), 210, to enroll and subsequently to request access to services from the Service Provider (SP). In the preferred embodiment of this invention, the SCD, 210, in a machine-to-machine mode of operation is preconfigured with the Individual Clients, 110, (for example, company employees who have access to the SCD) authentication data comprising, the IC's digitally Public Key Digital certificate(s) and digitally signed Biometric Digital Certificate issued by the Public Key Certification Authority, 300, and the Biometric Certification Authority, (BCA), (800), respectively. Also, in this preferred embodiment, it is assumed that the Secure Computing-Device, (SCD), has been registered and issued a Secure Device Digital Certificate, (SDDC), by certified by the accredited Secure Devices Certification Authority (SCDA), 900. In this preferred embodiment, various distributed Blockchain databases, 500, both private and public Blockchains, will have been created to support online transactions for the Secure-Computing-Devices associated with various service sectors. Furthermore, in accordance with the preferred embodiment, the private and public Service Provider(s), 600, and the Trusted Sources, 700, will have created authentication databases to suit their business models. The Data Analytics Authentication Processor (DAAP), 400, is responsible for collecting, analyzing, correlating all authentication data and calculating the Service-Access-Authentication-Tag, (SAAT), score which determines whether the SCD-generated request should be granted or denied access to the requested service.

In another embodiment of this invention the DAAP dynamically creates and continually updates the Biometric Blockchain Database, 510, each time IC requests access to the services offered by the Service Provider, 600. The Biometric Blockchain Database, 510, is a distributed database that maintains a continuously-growing list of biometric credentials of the authorized IC. By design none of the Biometric records in the Biometric Blockchain Database can be altered fraudulently because the stored records are cryptographically protected. This feature can be used effectively to minimize or completely eliminate the use of stolen identities to commit online fraud. The Biometric Blockchains Database comprises:
 a. the IC biometric data supplied by the IC;
 b. the IC's biometric data from the Trusted Source Databases and the Service Providers Databases, 600;
 c. the IC's biometric data from other public/private Blockchain Databases;
 d. the IC's live-video clips of the IC creating IC's digitized hand-written signature samples on the Portable-Computing-Device, 200, or the Secure-Computing-Device;
 e. live-video clips of IC's facial expressions while answering a set of random questions posed by the DAAP, 400;
 f. the hand-written signatures of the IC obtained directly from the IC;
 g. the IC's digitized hand-written signatures samples from other public/private Blockchain Databases; and
 h. one or more of the IC's biographical data acquired during the enrollment-request-session or during the service-request-session.

Still another embodiment of this invention comprises the creation and use of the Biographical Blockchain Database, 520, that is updated each time the IC requests access to the services offered by the Service Provider. This Biographical Blockchain Database comprises:
 a. the IC' biographical data supplied by the IC;
 b. the IC's biographical data from the Trusted Sources Databases and the Service Providers Databases, 600; and
 c. the IC's biographical data from other public/private Blockchain Databases.

Another embodiment of this invention is the mandatory enrollment process necessary to establish the authenticity of the online Individual Client, 100, or the Secure-Computing-Device. In both cases, the enrollment process is designed to capture the most recent IC's personal data for authentication given that IC's biographical data and the IC's biometric data vary over time (eg change of address, change of marital status, facelift etc.). The following steps and actions are carried out by the Individual Client, 100, or by the IC, 110, using the SCD, 210, and by the Data Analytics Authentication Processor, 400, during the enrollment process, the enrollment process comprising:
 a. The IC downloads an application from the DAAP, 400, onto the PCD, 200, or onto the SCD, 210;
 b. The Individual Client's, 100, Portable-Computing-Device, 200, transmits two digitally signed certificates; the Biometric Digital Certificate, (BDC), and the personal digitally signed IC's Public Key Digital Certificate to the Data Analytics Authentication Processor (DAAP), 400;
 c. In the case of the Secure-Computing-Device, 210, (SCD), the SCD transmits to the DAAP, 400, one or more of the IC's Biometric Digital Certificate(s), (BDC), one or more of the personal digitally signed IC's Public Key Digital Certificate (s) depending on how many ICs, 110, have permissions to use the SCD and the Secure Device Certificate, (SCD). The digital certificates authorize the DAAP, 400, to access and retrieve the IC's biometric data and the IC's biographical data from other authoritative and the trusted sources databases clearly identified in the digital certificates;
 d. During enrollment-request-session, the Individual Client, 100, or the SCD's IC 110 is requested to provide a list of possible services that the Individual Client, 100 or the SCD Individual Clients, 110, may need now and, in a near future in which the ICs wants to be enrolled; and
 e. As an additional layer of built-in security, the Individual Client, 100, or the SCD Individual Clients, 110, are prompted by the DAAP, 400, to answers personal security questions posed by the DAAP, 400. The security question is a form of "shared secret" between the IC and the DAAP.

Yet another embodiment of this invention is the capturing of IC's personal data of the Individual Client, 100 or 110. The data is collected by the Portable-Computing-Device 200 or by the SCD 210 during the enrollment-request-session or during the service-request-session and sent to the DAAP, the IC's personal data comprising:
 a. One or more of the IC's biographical data as directed by the DAAP 400;
 b. One or more of the of the IC's biometric data as directed by the DAAP, 400; and
 c. One or more of digitized pictures of the IC's frontal and IC's side views of the IC's face.

Yet another embodiment of this invention is the collection of IC's live-video clips of the Individual Client for ascertaining that these individuals are who they claim to be. The following data is collected by the Portable-Computing-Device, 200, or by the SCD, 210, during the enrollment-request-session or during the service-request-session and sent to the DAAP, the IC's live-video clips comprising:

a. one or more of IC's live video clips of the IC's facial expressions while answering specific questions posed by the DAAP, 400, and whose answers are known only to the IC;

b. capture and submit to the DAAP, 400, one or more of the IC's live video clips of the IC's hand and pen movements while creating the IC's digitized hand-written-signature samples on the PCD, 200, or the SCD screens; and c. capture and transmit to the DAAP, 400, one or more of the IC's digitized hand-written-signatures samples. These data are used to ascertain that the online ICs are who they claim to be.

Yet in another embodiment of this invention, the DAAP, 400, requests and receives the Individual Clients, 100, or 110, IC's personal data from the other Public/Private Blockchains databases the Service Providers Databases, 600, the Trusted Sources Databases such as AML, (Anti Money Laundering databases), for vetting the IC during the enrollment-request-session or during the service-request-session. Access to the information in the public or private Blockchains databases, (defined as those databases where IC personal data is collected and stored with or without their consent), the Service Providers, 600, databases and the Trusted Sources databases requires that the DAAP must submit a request accompanied by a digitally signed IC's public key digital certificate and the IC's Biometric Digital Certificate in which the usage is clearly spelled out as access for retrieving the specific IC's personal data from the named databases.

The DAAP on its part must present its own signed Secure Device Digital Certificate so it can be granted access to retrieve the specified data from the Blockchains Databases, the Service Providers Databases, 600, and the Trusted Sources Databases. A typical embodiment is a CRA, (Credit Reference Agency), requiring access to the credit information from private or consortium Blockchains established to serve the Banking and Financial communities.

Distributed Blockchain ledgers or databases will provide the most up-to date recent and traceable data transaction associated with the IC. This data is used by the DAAP to create the most up-to-date Service-Access-Authentication-Tag, (SAAT). The Blockchain database, the Trusted Source databases, and the Service Providers databases, 600, will in turn issue Digital Certificates to allow the DAAP to access these databases In another embodiment, the DAAP, 400, collects IC's personal data from the Trusted Sources Databases, 700, for IC authentication during the enrollment-request-session or during the service-request-session.

The Trusted Sources from which the IC's personal data will be retrieved comprising:

a Electoral Commissions
b. Biometric Records
c. Biographical Records
d. Credit Information
e. Drivers License Bureau
f. Ministry of Justice Records
g. Real Estate Transactions
h. Stock Market Information
i. Insolvency Agencies
j. Driver Licenses Insurance
k. Passport Issuance
l. National ID Information
m. Travel Industry IC record
n. International Police information
o. School Registration and Graduation Data
p. Civil Service Employee Records
q. Military employees Records
r. Public Hospital Healthcare Records
s. Police Records
t. Tax Records
u. Individuals that have been identified by the IC as personal references and
v. Business entity registration data.

In another embodiment of this invention is the creation of the Secure-Computing-Device, SCD, 210. The SCD in conjunction with the Hardware Security Module maintains and ensures that the Individual Clients' certificates are current. If there are any changes to the IC's status, the SCD immediately updates the DAAP. Thus, the SCD comprising:

a. A Processor;
b. Memory;
c. Camera;
d. Software;
e. the ICs signed Public Key Digital Certificate(s) issued by the accredited Public Key Certification Authority, CA;
f. the ICs signed Biometric Digital Certificate(s) issued by the accredited BCA;
g. A unique Secure Computing Device Digital Certificate issued by the accredited Secure Devices Certification Authority; and
h. A Hardware Security Module (HSM).

The HSM is a prior art, internationally certified, physical hardware device that plugs into the computing device and safeguards and manages all the SCD Digital Keys and provides strong authentication against hacking.

In another embodiment of this invention is the creation of the Data Analytics Authentication device, (DAAP). The DAAP comprising:

a. A DAAP Processor;
b. A DAAP Memory;
c. A DAAP Camera;
d. Application Program Interfaces, (APIs) and Software;
e. Owns the digitally signed IC's Public Key Digital Certificate issued by the accredited Public Key Certification Authority, (PKCA);
f. The unique Secure Device Digital Certificate issued by the accredited Secure Devices Certification Authority; and
g. A Hardware Security Module, (HSM).

In another embodiment of this invention is the process of validating the IC's personal data by comparing it with the IC's personal data collected from various sources before enrolling the Individual Client, 100, or 110. The DAAP compares, analyses and correlates the data and identifies differences. If differences exist, the IC is requested to correct and resubmit the data. As part of the initial validation of the submitted data, the DAAP analyses and correlates the current session data submitted by the IC and compares it with data from other sources comprising:

a. The information and data contained in the IC's digital certificates;
b. Data obtained from the Biometric Blockchain Database, 510;
c. Data from the Service Providers databases, 600;

d. Data from the Trusted Sources Databases; and
e. Data from the other public/private Blockchain Databases.

If the validation of IC service-request-session data is successful, then the enrollment data and that from other sources are stored securely by the DAAP and sent to all Blockchain databases for secure storage.

In another embodiment of this invention is the process of validating the service-request-session IC personal data by comparing it with the data from the enrollment-request-session stored by the DAAP. As part of this validation of the submitted data, the DAAP analyses and correlates the service-request-session stored IC's personal data and compares it with IC's personal data from other sources comprising:
   a. The information and data contained in the IC's digital certificates
   b. Data obtained from the Biometric Blockchain Databases, 510
   c. Data from the Service Providers databases, 600
   d. Data from the Trusted Sources Databases and
   e. Data from the other public/private Blockchain Databases If the validation of user supplied service-request-session data is successful, then the enrollment-request-session IC's personal data is updated and stored securely by the DAAP and sent to all Blockchain databases in the network. Furthermore, the Biometric Blockchain Databases, 510, and the Biographical Blockchain Databases are updated. These databases are later used by the Biometric Certification Authority to issue Biometric Digital Certificates.

Another of authenticating embodiment of this invention is the process the online IC. The process includes the calculation of the Enrollment-Authentication-Tag (EAT) the Session-Authentication-Tag, (SAT) and the Service-Access-Authentication-Tag, (SAAT) by analysing, comparing and correlating the IC's personal data comprising:
   a. the IC's Biometric data from the Biometric Blockchain Database, 510, the IC's Biometric data supplied by the IC during a service-request-session, the IC's Biometric data from the Trusted sources databases; the Service Providers databases; and other private or public Blockchain Databases;
   b. the IC's Biographical-data from the; Biographical Blockchain Database; the IC supplied IC's Biographical data during service-request-session; the IC's biographical data from the Trusted Source databases; the Service Providers databases; and other private/public Blockchain Databases, 500; and
   c. the IC's live-video clips from the Biometric Blockchain Database 510; the IC supplied live-video clips; the Trusted Sources databases; the Service Providers databases, 600; and other private/public Blockchain Databases.

The DAAP, 400, processes and ranks the IC's personal data from the enrollment-request-session and the IC's personal data from the service-request-session based on importance, assigning weights and scoring each item of the components in the three data groups above, (namely: the IC's Biometric data, the IC's Biographical Data and the IC's live-video clips data), to generate the EAT and the SAT (Session-Authentication-Tag), respectively. The Service-Access-Authentication-Tag, (SAAT), is calculated using a combination of at least the partial of the scores of the Enrollment-Authentication-Tag, (EAT), and the partial of the current Session-Authentication-Tag, (SAT). The SAAT must meet a predetermined threshold to grant access to the service. The enrollment data, the service-request-session data and the SAAT score are then stored in the Blockchain Databases.

Yet another embodiment of the present invention is the capturing of the Internet Protocol Address, (IPA), and the Global Positioning System's, (or equivalent systems such as the European GALILEO or the Russian GLONASS or Chinese BEI-DOU,) location co-ordinates of the PCD or the SCD. This data is compared with that captured during the enrollment-request-session. If the enrollment-request-session GPS location differs from the service-request-session location, then the DAAP requests other personal data that is only known to the IC.

In another embodiment of this invention is the process allowing the subscribed Service Providers, 600, to self-manage their service profile in the DAAP, 400, including loading new profile and updating existing profiles. Once the Service Provider is authenticated using digitally signed public key certificates, the Service Providers, 600, can modify the service profiles supported in the DAAP, 400, without affecting other Service Providers', profiles. For example, a Service Provider can upload a list of the services that can be accessed through the DAAP, 400, and for each service listed, what type and level of authentication is to be expected from the DAAP, 400, as the minimum acceptable threshold score for the Service-Access-Authentication-Tag, (SAAT), score.

The invention claimed is:
1. A method for identifying and authenticating a person using a computing device in non-face-to-face transactions using a combination of blockchain technology, public key cryptography, Individual Client's (IC) live video clips (ICLVC) of an IC while performing actions requested by a Data-Analytics-Authentication-Processor (DAAP) and using an IC's biometric digital certificate to provide security and protection of IC's personal data (IPD) from unauthorized access, unauthorized using, unauthorized changing, phishing, spoofing or deleting, the method comprising:
   a) submitting, by the IC using a Portable Computing Device (PCD), the IC's Biometric Digital Certificate and IC's Public Key Digital Certificate to the DAAP authorizing the DAAP to retrieve the IC's personal data directly from the IC as well as to retrieve the IC's biographical data from a Biographical Blockchain Databases (BGBD) and to retrieve the IC's biometric data from Biometric Blockchain Databases (BBD), or to retrieve the biographical and biometric data from other Public/Private Blockchain Databases (PPBD), Trusted Sources Databases (TSD), and Service Providers Databases (SPD);
   b) submitting, by a Secure Computing Device (SCD) to the DAAP, the IC's Biometric Digital Certificate, the IC's Public Key Digital Certificate, and a Secure Device Digital Certificate authorizing the DAAP to retrieve the IC's personal data from the SCD stored at a Secure Devices Certification Authority, including the IC's personal data received directly from the IC and the IC's personal data retrieved from the BBD, the BGBD, the PPBD, the TSD and the SPD;
   c) capturing, by the DAAP from a Service Provider (SP), lists of requirements necessary for authenticating the IC;
   d) during an enrollment request session or during a service request session:
      i) capturing, by the DAAP, the IC's personal data directly form the IC and additionally receiving the

IC's personal data from the BBD, the BGBD, the PPBD, the TSD and the SPD;
ii) capturing, by the DAAP, the IC's live video clips of the IC performing a specific action as directed by the DAAP;
iii) capturing, by the DAAP, the IC's digitized handwritten signature samples (IDHWS) directly from the IC and the IDHWS from the BBD, the BGBD, the PPBD, the TSD and the SPD
iv) capturing, by the DAAP, a list of services that the IC may want to access; and
v) capturing, by the DAAP, the IC's personal data from other distributed Blockchain Databases historical transaction records of the IC for one or more services that the IC may have requested and obtained from the SP prior to the enrollment request session;
e) updating, by the DAAP, the BBD with the IC's Biometric Data (ICBD) obtained from the enrollment request session or form the service request session and uploading a copy of the IC's personal data to a Biometric Certificate Authority (BCA) database;
f) updating, by the DAAP, the BGBD with the IC's Biographical Data (ICBID) obtained from the enrollment request session or from the service request session;
g) correlating and comparing, by the DAAP, the IC's personal data from the enrollment request session to the IC's personal data from the service request session and generating a list of discrepancies;
h) using, by the DAAP, the IC's personal data to calculate and generate an Enrollment Authentication Tag (EAT) based on IC's personal data from the enrollment request session, a Session Authentication Tag (SAT) based on the IC's personal data from the service request session, a Service Access Authentication Tag (SAAT) that is calculated by combining the EAT and the SAT, an IC-specific compliance profile that determines an IC to generate the SAAT and an IC-specific profile that determines the IC's precise eligibility and entitlement to access services offered by a plurality of online service providers and then stores the IC's personal data in the BBD, the BGBD, the SPD, the TSD, and the PPBD for a safe and secure historical record of all transactions and processing results.

2. The method of claim 1, wherein the DAAP receives the ICBID directly from the IC and receives the ICBID from the BGBD, the TSD, the SPD, and the PPBD to be used for authenticating the IC, wherein the ICBID comprises at least one or more of:
a) birth date;
b) birth certificate number;
c) residential information;
d) names of the IC;
e) next of kin names;
f) email addresses;
g) social media addresses;
h) phone numbers;
i) fax numbers
j) social security number;
k) passport number
l) driver's license number;
m) student ID;
n) Medicaid/Medicare number;
o) landed immigration number;
p) credit card numbers;
q) bank names and account numbers;
r) security questions wherein the answers are only known by the IC;
s) education level
t) marital status
u) social insurance number;
v) green card number;
w) whether the IC is on a no-fly list; and
x) whether the IC is on a suspect terrorist list.

3. The method of claim 1, wherein the DAAP captures directly the ICBD from the IC using the Portable Computing-Device or the Secure-Computing-Device and additionally retrieves the IC's personal data that is used to authenticate the IC from the BBD, the TSD, the SPD, and the PPBD, the ICBD comprising:
a. one or more of the IC's live-video clips showing IC's facial expressions while answering random questions posed by the DAAP;
b. one or more of IDHWS;
c. one or more of digitized pictures of a direct face view and side views of the IC;
d. one or more of IC's digitized fingerprints;
e. one or more of IC's iris scan and retina scan analysis data;
f. one or more of IC's vein scan data; and
g. one or more of IC's DNA data.

4. The method of claim 1, wherein live movements of hand and pen, and live facial expressions while creating the IDHWS on the Portable-Computing-Device or the Secure-Computing-Device are simultaneously captured, comprising:
a. recording which hand is used to sign;
b. calculating speed of pen movements;
c. time it takes to complete the IDHWS;
d. capturing positions of a pen and fingers while the IC is creating the IDHWS;
e. capturing signature image sizes and resizing them to a standard size;
f. capturing the number of eye lid movements while creating the IDHWS; and
g. capturing lip movements if any, while creating the IDHWS.

5. The method of claim 1, wherein the IC's live-video clips and IC's facial expressions while answering random questions are captured by the Portable-Computing-Device or the Secure-Computing-Device and uploaded to the DAAP, the IC's live-video clips and the IC's facial expressions comprising:
a. eye and brow movements,
b. mouth opening sizes;
c. lips movements;
d. average rate of eye closures per second;
e. average rate of lip closures; and
f. capturing actual answers to the random questions.

6. The method of claim 1, wherein the IDHWS are analysed by the DAAP consisting of:
a. identifying whether the IDHWS is cursive or not;
b. capturing shapes and sizes of key characters in the IDHWS if possible;
c. capturing the number of alphabetical letters in the IDHWS;
d. capturing the number of distinctive numerical letters in the IC's digitized hand-written signature samples, if any exist;
e. capturing the number of distinctive dots and crosses in the IDHWS, if any exist;
f. identifying and capturing initials in the IDHWS, if any exist; and g. identifying and capturing symbols in the IDHWS, if any exist.

7. The method of claim 1, wherein the DAAP captures the ICBID and the ICBD from the Trusted Sources Databases by submitting its own signed Secure Device Digital Certificate, the Trusted Sources Databases comprising:
   a. Electoral Commissions;
   b. Driver License Bureaus;
   c. Ministry of Justice Records;
   d. Insolvency Agencies;
   e. Passport Offices;
   f. School Registration Records;
   g. Civil Service Employee records;
   h. Military records;
   i. Hospital Healthcare Records;
   j. Police Records;
   k. Tax Records;
   l. An individual who knows the IC personally; and
   m. Any other Trusted Source as directed by the DAAP.

8. The method of claim 1, wherein the DAAP captures attributes of the Portable Computing Device or the Secure Computing Device comprising:
   an Internet Protocol Address, (IPA), a Media Access Control, (MAC) address, and a geographical location as given by a Global Positioning System's coordinates (GPS) and uses the attributes to authenticate the PCD or the SCD.

9. The method of claim 1, wherein the DAAP performs an analysis of the IC's personal data collected by the DAAP from all sources against the lists of requirements from the Service Provider, the analysis of the IC's personal data comprising:
   a. assigning, by the DAAP, biographical mathematical weights to items in the ICBID as rated and determined by the Service Provider;
   b. assigning, by the DAAP, biometric mathematical weights to information in the ICBD as rated and ranked and by the Service Provider;
   c. assigning, by the DAAP, live-video mathematical weights to the ICLVC obtained from the enrollment-request-session and from the service-request-session;
   d. assigning, by the DAAP, digitized hand-written signature mathematical weights to the IDHWS in the BBD as rated and determined by the Service Provider;
   e. computing, by the DAAP, a Biographical-data-matching-score by comparing the ICBID that are stored in the BBD against the ICBID from the Service Providers databases;
   f. computing, by the DAAP, a Biometric-data-matching-score by comparing the ICBD that are stored in the BBD against the ICBD from the Service Providers databases;
   g. computing, by the DAAP, a live-video-matching-score by analyzing the IC's live-video clips that were captured during the service-request-session to the ICLVC captured during the enrollment-request-session;
   h. computing, by the DAAP, a digitized hand-written-signature-matching-score by comparing the IDHWS from the ICBID to the IDHWS from the service-request-session;
   i. computing, by the DAAP, an IC-specific-compliance profile that is based on the lists of requirements as provided by the Service Provider consisting of weighted scores for each of the items on the lists of requirements that the Service Provider had supplied earlier and dependent on the lists of services offered by the Service Provider;
   j. computing, by the DAAP, the Enrollment-Authentication-Tag, as a weighted average comprising: the Biometric-data-matching-score; the Biographical-data-matching-score; the live-video-matching-score that is based on the IC's personal data from the enrollment-request-session;
   k. computing, by the DAAP, the Session-Authentication-Tag, as a weighted-average score comprising: the Biometric-data-matching-score; the Biographical-data-matching-score; the live-video-matching-score based on the IPD from the service-request-session, and;
   l. computing, by the DAAP, the Service-Access-Authentication-Tag using a combination of the Enrollment-Authentication-Tag and the Session-Authentication-Tag; and finally storing the IPD; the Enrollment-Authentication-Tag; the Session-Authentication-Tag; and the Service-Access-Authentication-Tag in the BBD; the BGBD; the SPD; the TSD; and the PPBD.

10. An apparatus for identifying and authenticating a person or a computing device in non face-to-face transactions, the apparatus comprising:
    a. interconnected devices and databases, each equipped with Application Program Interfaces, (APIs), that allows for exchanging IC's personal data between a Data-Analytics-Authentication-Processor, (DAAP), and the interconnected devices and the databases, the interconnected devices and the databases comprising:
       i. DAAP APIs that allows for data exchanges to and from Biographical Blockchain Databases, (BGBD), Biometric Blockchain Databases, (BBD), Trusted Sources Databases, (TSD), Service Providers Databases (SPD), Public Key Certification Databases (PKCD), Biometric Certification Databases (BCD), and other public/private Blockchain Databases (PPBD);
       ii. a DAAP main processor;
       iii. a DAAP main memory;
       iv. a DAAP application program that when executed allows for identifying and authenticating of an Individual Client (IC), identifying and authenticating of a Portable Computing Device (PCD), identifying and authenticating of a Secure Computing Device (SCD); and accordingly, granting or denying access to services requested by the IC;
    b. the PCD comprising:
       i. a PCD API that supports data exchange between the DAAP and the PCD;
       ii. a PCD main processor;
       iii. a PCD main memory;
       iv. a PCD application program that when executed allows the DAAP to identify and to authenticate the PCD and the IC;
       v. a PCD accessory capable of capturing IC personal data;
       vi. a PCD camera capable of capturing an IC's live-video clips (ICPVC);
       vii. the IC's Biometric Digital Certificate;
       viii. a PCD Public Key Digital Certificate; and
       ix. the IC's Public Key Digital Certificate;
    c. the Secure-Computing-Device, (SCD), comprising;
       i. an SCD API that supports the IC's personal data exchanging between the DAAP and the SCD;
       ii. an SCD main processor;
       iii. an SCD main memory;
       iv. an SCD application program that when executed allows the DAAP to identify and to authenticate the SCD and the IC;

v. an SCD accessories capable of capturing the IC's personal data;
vi. an SCD camera capable of capturing the IC's live-video clips;
vii. the IC's Biometric Digital Certificate;
viii. an SCD Public Key Digital Certificate; and
ix. the IC's Public Key Digital Certificate;

d. the Biometric Blockchain Databases equipped with a BBD API that supports the data exchange between the DAAP and the Biometric Blockchain Databases and capable of storing immutably IC's Biometric data (ICBD);

e. the Biographical Blockchain Databases equipped with a BGBD API that supports the data exchange between the DAAP and the Biographical Blockchain Databases and capable of storing immutably IC's Biographical data;

f. the Biometric Certification Databases equipped with a BCD API that supports the data exchange between the DAAP and the Biometric Certification Databases and capable of issuing a digitally signed IC'S Biometric Digital Certificate to the IC;

g. the Trusted Sources Databases equipped with a TSD API that supports the data exchange between the DAAP and the Trusted Sources Databases and capable of issuing the IC's personal data to the DAAP;

h. the Service Providers Databases equipped with an SPD API that supports the data exchange between the DAAP and the Service Providers Databases and capable of capturing and issuing the IC'personal data to the DAAP;

i. the Public Key Certification Databases equipped with a PKCD API that supports the data exchange between the DAAP and the Public Key Certification Databases and capable of storing and issuing Public Key Digital Certificates to the IC; the DAAP; the PCD; and the SCD; and and j. the other Public/Private Blockchain Databases equipped with a PPBD API that supports the data exchange between the DAAP and the other Public/Private Blockchain Databases and capable of storing immutably public and private online transactions.

11. The apparatus of claim 10, the Data-Analytics-Authentication-Processor, comprising:
a. a DAAP Secure Device Public Key Digital Certificate serving as a unique online identifier of the DAAP;
b. a DAAP Hardware Security Module (HSM) that safeguards and securely manages digital keys for strong authentication and supports secure crypto processing; and
c. the Application Programming Interfaces comprising:
i. a DAAP Biometric Blockchain Databases API;
ii. a DAAP Biographical Blockchain Databases API;
iii. a DAAP Service Providers Databases API;
iv. a DAAP Personal-Computing-Device API;
v. a DAAP Secure-Computing-Device API; and
vi. a DAAP other Public/Private-Blockchain-Databases API.

12. The apparatus of claim 10, wherein the DAAP main processor when executing the DAAP application program causes the Portable-Computing-Device to identify itself by submitting the PCD Public key Digital certificate with other attributes comprising:
an Internet Protocol Address (IPA);
a Media Access Control address (MAC); and
a geographical location as given by a Global Positioning System's coordinates
wherein the PCD is further instructed to submit the IC's personal data comprising:
the IC's Biometric data;
the IC's Biographical data; and
the IC's live-video clips during an enrollment request session or during a service request session.

13. The apparatus of claim 10, wherein the DAAP main processor when executing the DAAP application program causes the Secure Computing Device to identify itself by submitting the SCD Public Key Digital certificate with other attributes comprising:
an Internet Protocol Address, (IPA);
a Media Access Control address, (MAC); and
a geographical location as given by a Global Positioning System's coordinates; wherein the SCD is further instructed to submit the IC's personal data comprising: the IC's Biometric data; the IC's Biographical data; and the IC's live video clips during an enrollment request session or during a service request session.

14. The apparatus of claim 10, wherein the DAAP main processor, when executing the DAAP application program, causes the Biometric Blockchain Databases, the Biographical Blockchain Databases, and the other Public/Private Blockchain Databases to immutably store the IC's Biometric data and the ICs Biographical data.

15. The apparatus of claim 10, wherein the DAAP main processor, when executing the DAAP application program, causes a Biometric Certification Authority to download and analyze the IC's personal data from the Biometric Blockchain Databases, the Biographical Blockchain Databases the other Public Private Blockchain Databases the IC's personal data directly from the IC, and granting or denying issuing the IC's Biometric Digital Certificate.

16. The apparatus of claim 10, wherein the DAAP main processor, when executing the DAAP application program, causes the Trusted Sources Databases and the Service Providers Databases to submit to the DAAP the IC's personal data for identifying and authenticating the IC.

17. The apparatus of claim 10, wherein the DAAP main processor, when executing the DAAP application program, causes a Public Key Digital Certification Authority as a Trusted Service Provider to approve or reject the IC's Public Key Digital Certificate after downloading and analysing the IC's personal data directly captured from the IC, the Biometric Blockchain Databases, and the Biographical Blockchain Databases.

18. The apparatus of claim 10, wherein the DAAP main processor, when executing the DAAP application program, performs an algorithmic correlation between the IC's personal data captured during service an enrollment-request-session and the IC's personal data captured during a service-request-session that allows for granting or denying of the services to the IC by the DAAP and by a Service Provider.

* * * * *